United States Patent [19]

Cone

[11] 4,207,019
[45] Jun. 10, 1980

[54] TRUCK DOCK WHEEL SAFETY CHOCK SYSTEM

[76] Inventor: Malcolm S. Cone, P.O. Box 38392, Germantown, Tenn. 38138

[21] Appl. No.: 941,012

[22] Filed: Sep. 11, 1978

[51] Int. Cl.$^2$ .......................... B65G 67/02; B60T 3/00
[52] U.S. Cl. ........................................ 414/373; 188/32; 188/4 R
[58] Field of Search ............... 414/373, 572, 401, 584; 188/4 R, 32; 187/8.52, 8.47

[56] References Cited

U.S. PATENT DOCUMENTS

| | | | |
|---|---|---|---|
| 2,661,505 | 12/1953 | Dilione | 52/6 |
| 3,305,049 | 2/1967 | Willey | 188/32 |
| 3,694,839 | 10/1972 | Loblick | 14/71.7 |
| 4,091,488 | 5/1978 | Artzberger | 14/71.7 |

Primary Examiner—Stephen G. Kunin
Assistant Examiner—Lawrence E. Williams

[57] ABSTRACT

A device for mechanically placing wheel chocks against the wheels of a truck-like vehicle as it is parked on the apron of a loading dock. The chocks are remotely controlled from a point of vantage by the dock attendant and certain provisions readily preclude the commencement of any loading and/or unloading operation involving the parked vehicle prior to the vehicle being properly chocked in place, and moreover, structure is included which precludes the likelihood of inadvertent movement of the vehicle away from the dock prematurely before the actual completion of the loading and/or unloading operations, thus avoiding fork lift accidents and personel injuries common in the industry.

12 Claims, 4 Drawing Figures

TRUCK DOCK WHEEL SAFETY CHOCK SYSTEM

BACKGROUND OF THE INVENTION

1. Field of the Invention

This invention relates to the field of devices for chocking motor vehicles and is particularly directed towards those type chocking devices which are fixably attached to the apron of a loading dock, i.e., as opposed to the numerous other type devices which are a permanent fixture attached to the vehicle.

2. Description of the Prior Art

Loading and unloading of truck-like vehicles at a typical loading dock have resulted in numerous accidents which may be attributed to the truck driver prematurely pulling the vehicle away from the loading dock, i.e., prior to the actual completion of the loading and/or unloading operation. In other words, the loading and unloading is usually facilitated with the use of a typical fork lift which travels between the truck away from the loading dock without the fork operator being forewarned subjects the fork lift operator to the hazard of causing the fork lift to fall several feet from the loading dock or from the truck bed. This type accident might appear as a very remote possibility, however, it has been rather prevalent in this industry.

Indeed, this type accident has been so prevalent that the Occupational Safety and Health Administration (OSHA) now requires that the truck-like vehicles, i.e., typical straight truck chasis or semi-trailer and tractor rigs and the like, have wheel chocks placed in front of the rear wheels prior to the commencement of any loading and/or unloading operations.

Obviously, the task of manually placing and removing these wheel chocks has, to say the least, not been totally satisfactory. In fact, one attempt directed toward solving the problem has been to modify each vehicle with a wheel blocking system and the like. Each of the following U.S. patents is directed toward such vehicle modification: U.S. Pat. No. 2,483,048 granted to Hergner; U.S. Pat. No. 3,086,619 granted to Grotz; U.S. Pat. No. 3,321,046 granted to Cooper; U.S. Pat. No. 3,547,228 granted to Wiley; U.S. Pat. No. 3,625,313 granted to Lowrie; and U.S. Pat. No. 3,722,631 also granted to Lowrie.

It will be appreciated by those skilled in the art that merely modifying the vehicle so as to enable the truck driver to operate the chocking system at his will and pleasure, does not eliminate the aspect of human error from the problem, i.e., accidents still prevail simply because the truck driver is able to move his truck away from the loading dock at his will and pleasure or prematurely without regard for the forklift operator.

In addition to the above mentioned patents, the applicant is familiar with the following three United States patents which pertain to other type vehicle immoblizing devices: Patent No. 3,149,583 granted to Morrill; Patent No. 3,623,688 granted to Ansund; and Patent No. 2,661,505 granted to Dilione. None of the heretofore mentioned patents disclose or suggest applicant's device.

Another concept directed toward solving the above mentioned problem includes power operated wheel block structure permanently attached to the apron of the loading dock. The applicant is familiar with one such system patented in the United States under U.S. Pat. No. 3,305,049 granted to Willey. Obviously, this approach to the problem offers certain advantages over modifying each vehicle. However, the problem still prevails in that the truck driver can inadvertently remove the wheel blocks prematurely or while the loading/unloading operation is still in progress. It should also be mentioned that the Willey '049 patent does not disclose or suggest applicant's device.

Indeed, none of the above mentioned patents includes structure which provides any assurance that the vehicle must, in fact, be chocked prior to commencement of the loading/unloading operation. In addition, even though the vehicle has been properly chocked prior to commencement of the loading/unloading operation, the likelihood of premature removal of the wheel chocks remains a strong possibility and hazard.

It is significant to note that, almost without exception, typical trucking dock installations are now equipped with a remotely controlled dockboard means which normally may be selectively moved between: (1) an operating position in which the floor of the elevated dock structure is bridged with the floor of the truck-like vehicle as it is parked on the apron for facilitating the travel of fork lifts and the like between the floor of the truck and the loading dock, and (2) a stowed position in which use of the dockboard means is interrupted. It will be appreciated by those skilled in the art that there are numerous different remotely controlled dockboard means. One such dockboard is disclosed in a U.S. Pat. No. 4,091,488 granted to Artzberger on May 30, 1978 and assigned to Kelly Company, Incorporated, Milwaukee, Wisconsin. The Kelly Co., Inc. and their various dockboard systems are well known to those skilled in the art. Therefore, no attempt will herein be made to fully disclose a dockboard system even though the present invention is closely related thereto, i.e., at least one embodiment of the present invention is in combination with a typical dockboard system. Accordingly, while it is believed that a brief description of a dockboard system will suffice for present purposes, reference should be made to the Artzberger '488 patent and others assigned to the Kelly Co., Inc. for a more detailed description of the character and structure of dockboard systems.

SUMMARY OF THE INVENTION

The present invention is directed towards overcoming the disadvantages and problems relative to properly placing wheel chocks in front of a truck parked on the apron of a typical loading dock. Moreover, the present invention virtually eliminates the safety hazard experienced heretofore and attributed to the premature movement of the truck away from the loading and as clearly described above.

The instant safety chock system is operatively coupled with the dockboard means for: (1) precluding the commencement of any loading and/or unloading operations involving the vehicle prior to the vehicle being properly chocked in place, and (2) conversely precluding the likelihood of inadvertent movement of the vehicle away from the dock prematurely before the actual completion of the loading and/or unloading operations.

The safety chock system of the present invention is operatively coupled with the dockboard system in such a manner that the dockboard means is disabled, i.e., it may not be moved from its "stowed" position, until action has been taken to properly chock the wheels of the truck. Conversely, the structure which moves the wheel chocks from the "vehicle chocked position" is disabled, i.e., precluding movement thereof to a "vehicle not chocked" position, until the dockboard means has first been moved to a "stowed" position.

Accordingly, it may readily be seen that the dock attendant has absolute control, not only of the dockboard system but of the truck-like vehicle as well, i.e., the dock attendant readily prevents the truck driver from pulling away from the dock prematurely. Thus the above mentioned hazard as a result thereof is totally eliminated.

DESCRIPTION OF THE PREFERRED EMBODIMENT

The truck dock wheel safety chock system 11 of the present invention which may hereinafter optionally be referred to as safety chock system or simply a chock system is intended to be utilized at a typical truck loading dock 13 of the type having remotely controlled dockboard means 15 which, as previously mentioned, is well known to those skilled in the art, i.e., merely one example thereof being taught by the previously mentioned Artzberger '488 patent.

Figure 4:
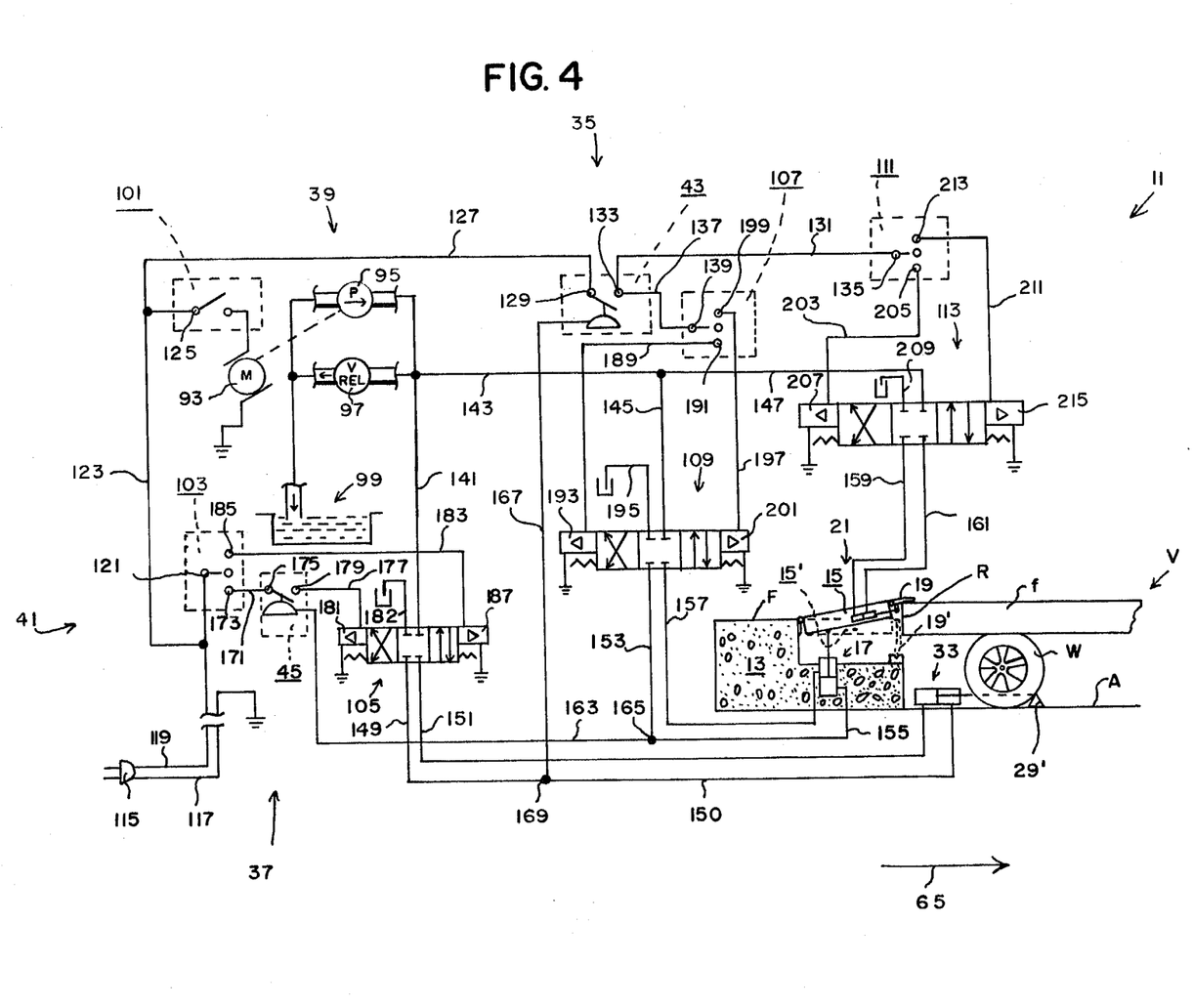
FIG. 4 is a schematic depicting the operative structure associated with the truck dock wheel safety chock system of the present invention.

It is deemed sufficient to simply state at this time that the remotely controlled dockboard means 15 normally may be moved indiscreetly to an "operative position," as best shown in FIG. 4 of the drawings in solid lines, in which the floor F of the elevated dock structure 13 is bridged with the floor f of a truck-like vehicle characterized herein by the letter V, as it is packed on the apron A of the dock 13 and as diagramatically depicted in FIG. 4 of the drawings. Therefore, it may readily be seen that the dockboard means 15 facilitates the loading and/or unloading process of the vehicles V when in the operative position, i.e., enabling fork lifts and the like to travel between the vehicle V and the loading dock 13.

FIG. 4 of the drawings also shows the dockboard means in a "stowed" position in broken lines and characterized therein by the numeral 15 having a prime suffix, thus 15' in which position use of the dockboard means 15 is interrupted.

Movement of the dockboard means 15 between the "operative" and "stowed" positions may be accomplished in various well known manners, e.g., a hydraulic cylinder, as at 17, and other well known power operative structure may be used for this purpose. It should also be mentioned that typical dockboards 15 oftentimes include remotely moveable lip bridging members, as at 19, which is shown in solid lines in FIG. 4 in an "operable" position and in broken lines in a "stowed" position, i.e., the "stowed" position being indicated by the numeral 19 having a prime suffix, thus 19'. Here again, the lip member 19 may be moved indiscreetly between the "operable" and "stowed" positions in various well known manners, e.g., a hydraulic cylinder as at 21, is indicated herein for that purpose.

The safety chock system 11 is operatively coupled with the dockboard means 15 for: (1) precluding the commencement of any loading and/or unloading operations involving the vehicle V prior to the vehicle V being properly chocked in place, and (2) conversely precluding the likelihood of inadvertent moving of the vehicle V away from the dock prematurely before the actual completion of the loading and/or unloading operations. The manner in which this is accomplished will be fully disclosed as the specification proceeds.

Figure 1:
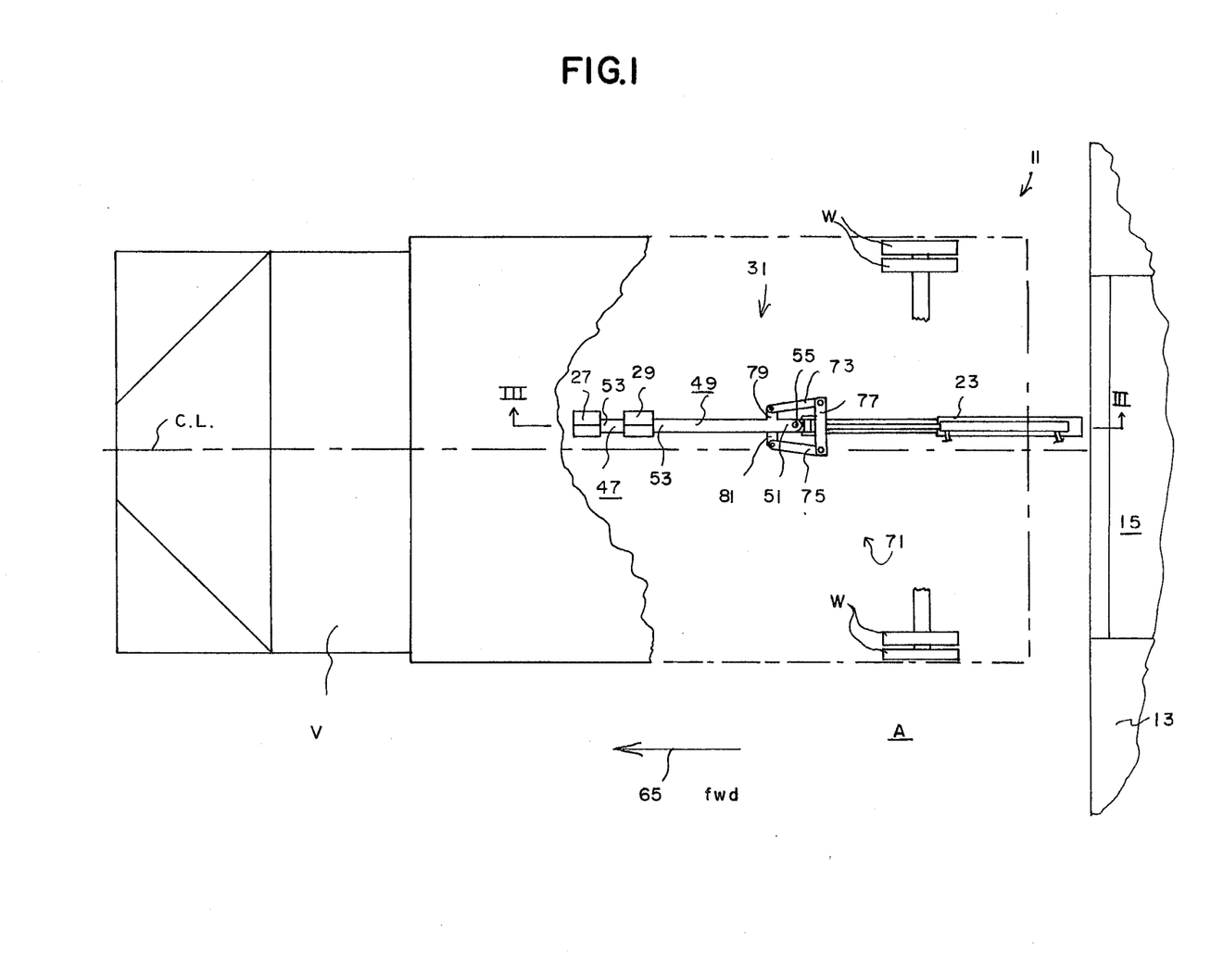
FIG. 1 is a plan view diagrammatically depicting a truck-like vehicle parked on the apron of a loading dock having a portion thereof broken away to reveal certain portions of the truck dock wheel safety chock system of the present invention which is shown disposed in a "vehicle not chocked" position.
Figure 2:
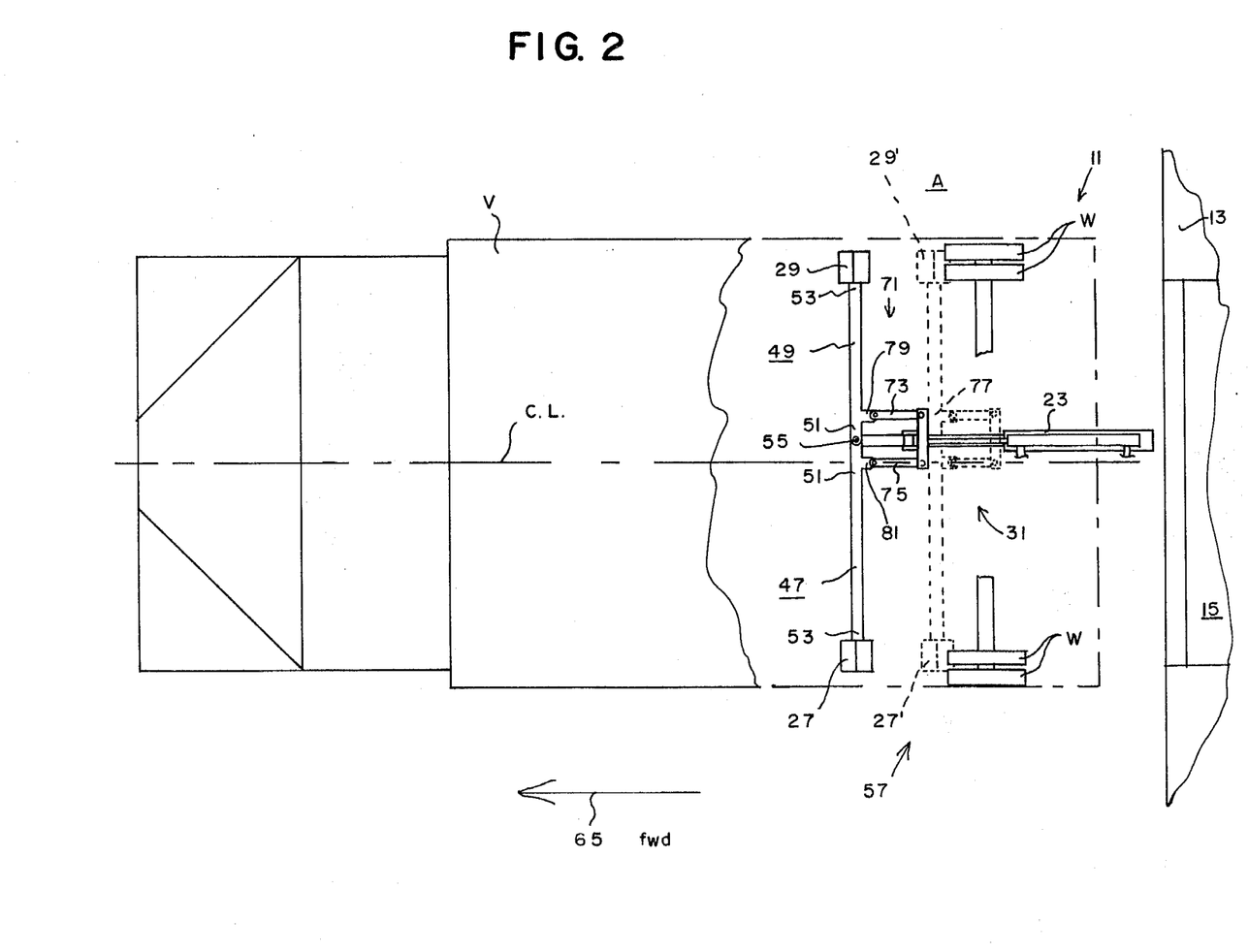
FIG. 2 is a view similar to FIG. 1 depicting the safety chock system of the present invention in a "vehicle chocked" position.
Figure 3:
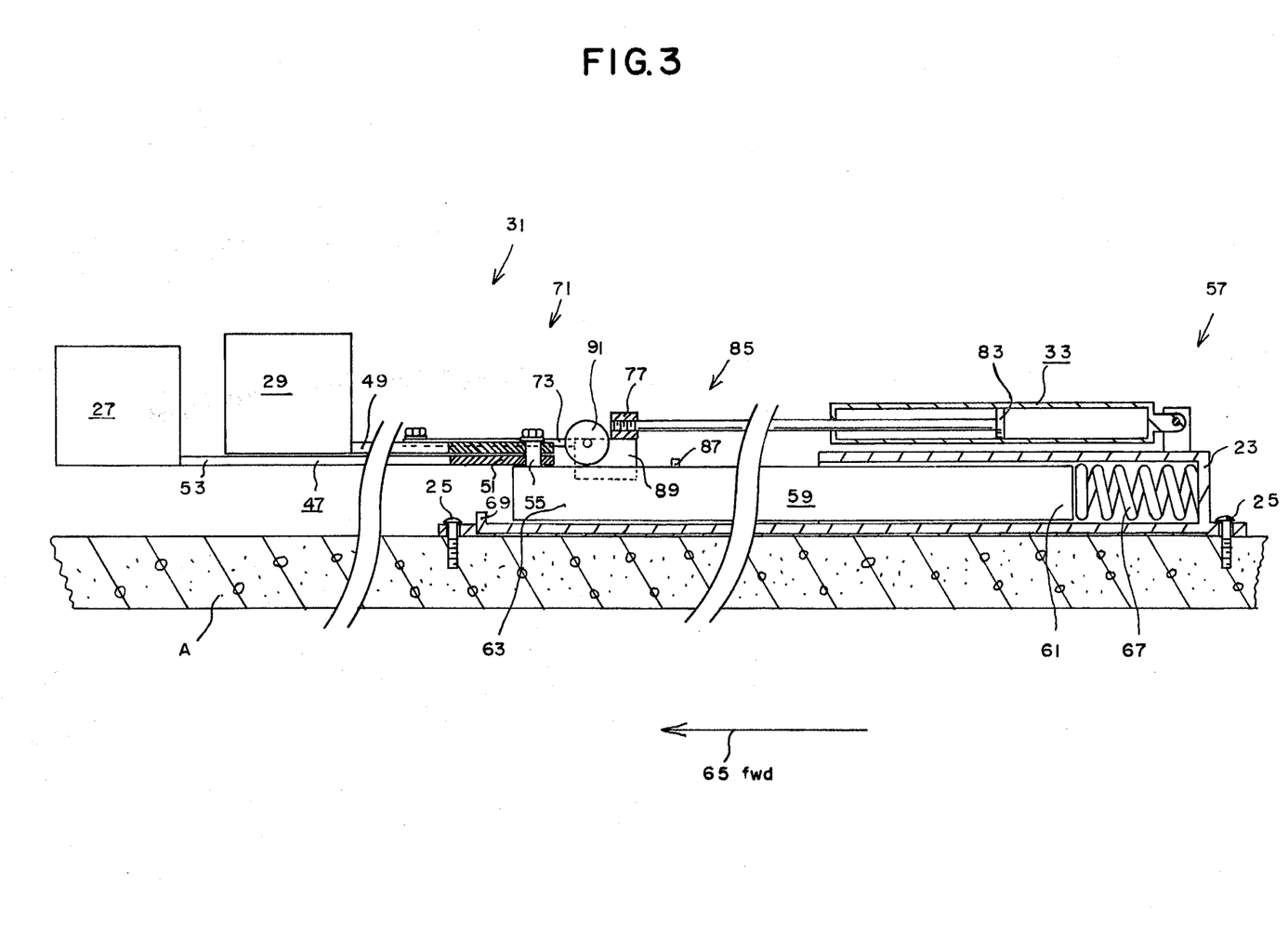
FIG. 3 is an enlarged partial sectioned view taken as on the line III—III of FIG. 1.

In general terms, the safety chock system 11 includes a main body member, as at 23, which is fixably attached to the apron A of the dock 13 in any well known manner, e.g., as with a plurality of typical fastener means 25 or the like as shown in FIG. 3 of the drawings. Obviously, the fixed position of the several dockboard means 15 uniformly spaced along the dock necessitates that specific parking slots be designated on the apron A so that the center line, characterized by the letters CL, of the vehicle V is placed substantially in line with the medial portion of the dockboard means 15. Accordingly, the main body member 23 preferably is arranged on the apron A so as to be straddled by the wheels, characterized by the letter W, of the vehicle V as it is being brought into the properly parked position. Of course the parking slots usually will be designated or determined by the position of the dockboard means 15 similarly as shown in FIGS. 1 and 2 of the drawings.

The chock system 11 also includes a pair of wheel engageable chock means, as at 27, 29, for engagement with the rearward wheel structure W of the vehicle V in selectively rendering the vehicle V substantially immovable.

The chock system 11 also includes reach means, generally indicated at 31, for operatively coupling the pair of wheel engageable chock means 27, 29 to the main body member 23, in a manner to be more fully disclosed later in the specification.

The chock system 11 also includes wheel chock actuating means, e.g., hydraulic cylinder means as at 33 or the like, for remotely controlling the movement of the reach means 31 to enable the pair of wheel engageable chock means 27, 29 to be remotely operable between a "vehicle chocked" position and a "vehicle not chocked" position.

From FIG. 4 of the drawings it may be seen that the chock system 11 includes preliminary check means, generally characterized with the numeral 35 and to be more fully disclosed below, for automatically precluding the operation of the dockboard means 15 from the stowed position 15' thereof prior to operatively moving the wheel engageable chock means 27, 29 to the "vehicle chocked" position thereof.

The safety chock system 11 also includes terminus check means, generally characterized by the numeral 37 to be more fully disclosed below, for automatically precluding the operation of the wheel engageable chock means 27, 29 from the "vehicle chocked" position prior to operatively moving the dockboard means to the stowed position 15' thereof.

With reference being directed again to FIG. 4 of the drawings it may be seen that the wheel chock actuating means alluded to above and the dockboard means 15 jointly include hydraulic system drive means generally indicated at 39 and to be more fully disclosed as the specification proceeds. The drive means 39 is responsive to electric system control means, generally indicated at 41, and to be more fully disclosed later in the specification. The functions of the drive means 39 are for: (1) remotely controlling the movement of the dockboard means 15 between "operative" and "stowed" positions thereof, and (2) remotely controlling the movement of the wheel engageable chock means 27, 29 between the "vehicle chocked" and "vehicle not chocked" positions thereof. Additionally, the preliminary check means 35 alluded to above includes a first hydraulic pressure actuated single pole single throw switch, as at 43, for electrically isolating the dockboard means 15 until such time that the pair of wheel engageable chock means 27, 29 have been operatively moved to the "vehicle chocked" position. Althought the schematic depicted in FIG. 4 will be fully disclosed later in the specification, it should now be mentioned that the first hydraulic pressure switch 43 is hydraulically responsive exclusively to pressure coincident with driving the wheel engageable chock means 27, 29 to the "vehicle chocked" position thereof.

Further, the terminus check means 27 alluded to above includes a second hydraulic pressure actuated single pole single throw switch, as at 45, for electrically isolating merely that portion of the wheel chock actuating means, or the hydraulic cylinder means 33, which controls the movement thereof from the "vehicle chocked" position to the "vehicle not chocked" position. The duration of this isolation lasts until such time that the dockboard means 15 has been operatively moved to the "stowed" position thereof. Accordingly, it may readily be seen that the second hydraulic pressure actuated switch 45 is hydraulically responsive exclusively to pressure coincident with driving the dockboard means 15 to the "stowed" position 15' thereof. This action will also be more fully disclosed later in the specification. Although, if desirable, the switch 45 may be deleted, in which event, the dock attendant would assume responsibility for the safe operation of the hydraulic cylinder means 33.

From FIGS. 1-3 of the drawings it may be seen that the reach means 31 alluded to above includes a pair of arm members 47, 49 each having inner and outer ends 51, 53 respectfully thereto. The inner ends 51 are physically coupled to the main body member 23, in a manner to be fully disclosed later in the specification, for pivotal movement about a pivot pin 55. Thus, this enables the outer ends 53, which respectfully carry the pair of wheel engageable chock means 27, 29, to swing outwardly toward either side of the vehicle V as clearly indicated in FIG. 2 of the drawings. In this manner, the pair of wheel engageable chock means 27, 29 may selectively be placed against the rearward wheel W of the vehicle V in rendering it substantially immovable.

It may readily be seen in FIGS. 1-3 of the drawings that the main body member 23 is not positioned in alignment with the center line CL. Additionally, the arm members 47, 49 overlap one another when in the "vehicle unchocked" position as shown in FIG. 1. Further, the arm member 47 is considerably longer than is the arm member 49 so that the entire apparatus as depicted in FIG. 3 of the drawings may present a minimum size target to the vehicle operator, thus straddling of the entire apparatus disposed on the apron A is facilitated. Accordingly, the entire apparatus as depicted in FIG. 3 is not disposed for alignment with the center CL but rather is displaced therefrom a distance substantially equal to the difference in the lengths of the arm members 47, 49.

The distance from the rearwardmost end of the floor f of various different configured vehicles V to the rearward wheels W thereof is not always the same. In other words, the overhang, i.e., the distance in which the truck body or floor f extends rearwardly beyond the rear wheels W varies from one make vehicle to another. Therefore, the chock system 11 preferably includes compensating means, generally indicated at 57 in FIG. 3 and to be more fully disclosed later in the specification, for compensating, within limits, the dimensional difference in location of the wheel structure W with respect to the rearwardmost end, as at R, of the floor f (FIG. 4) of different trucklike vehicles V.

The compensating means 57 alluded to above is best shown in FIGS. 2 and 3 of the drawing and includes carriage means, as at 59, disposed between the main body member 23 and the reach means 31. The rearward portion, as at 61, of the carriage 59 is slidably attached to the main body member 23 for guidable constrained movement to and fro coincidently along or parallel with the longitudinal axis of the vehicle V with the reach means 31 being attached to the forward portion 63 of the carriage means 59, i.e., the forward direction is indicated in FIGS. 1-4 by an arrow 65.

Accordingly, the previously mentioned pivot pin 55 is suitably attached to the forward portion 63 and is carried to and fro therewith in a manner to be described below.

The compensating means 57 also includes bias means, e.g., a compression spring 67 or the like, for yieldably urging the carriage means 59 and/or the reach means 31 in a forward direction (indicated by the arrow 65) or away from the main body member 23. Thus, this causes the pair of wheel chock means 27, 29 to be moved (or urged away) from a first extreme (or rearwardmost) position as shown in broken lines by the numerals 27', 29' in FIG. 2. Stated another way, the first extreme position corresponds to the lower limits of the variance in location of the wheel structure W with respect to the rearwardmost end R of the floor f of certain vehicles W. Thence, the reach means are caused to be moved to a second extreme position (or forwardmost) position thereof as shown in solid line in FIG. 2, and which corresponds to upper limits thereof.

Therefore, the wheel engageable chock means 27, 29, i.e., when in the "vehicle unchocked position" as shown in FIG. 1, are maintained in a forwardmost position as indicated by the arrow 65. Accordingly, it may now be seen that operation of the hydraulic cylinder means 33 accomplishes the dual function of: (1) extending the arm member 47, 49 outwardly to the position shown in solid lines in FIG. 2, and (2) they are then carried rearwardly while in this outwardly extended position to the location of and engagement with the rearward wheels W, i.e., urging the wheel engageable chock means 27, 29 against the rearward wheels W or as indicated in broken lines by the numerals 27', 29' in FIG. 2.

Accordingly, the compensating means 57 includes stop means, as in 69, in FIG. 3, which coacts with the main body member 23 and the carriage means 59 for limiting the forwardmost travel of the carriage means 59. The stop means 69 may simply consist of nothing more than a bar or barrier fixedly attached, as by welding or the like, to the main body member for engagement with the carriage means 59, as clearly shown in FIG. 3 of the drawings.

The reach means 31 includes articulate means, as at 71 and thus generally shown in FIGS. 1 and 2 of the drawings, for causing the pair of wheel engageable chock means 27, 29 to swing arcuately through a quadrant in the process of being moved between the "vehicle chocked" and the "vehicle not chocked" positions thereof. More specifically, the articulate means 71 includes a pair of somewhat parallel disposed link members, as shown at 73, 75 in FIGS. 1–3 of the drawings, respectively having one of the ends thereof pivotally attached to either end of a cross member 77. The arm members 47, 49 respectively include a pair of tab like lugs 79, 81 which are pivotally attached to the opposite ends of the link members 73, 75, i.e., the ends thereof which are remotely situated from the cross members 77.

Therefore, it may readily be seen, from FIGS. 1 and 2 of the drawings, that operation of the hydraulic cylinder means 33, i.e., movement to and fro of a piston member 83 thereof, is indirectly effective in arcuately swinging the wheel engageable chock means 27, 29 between the "vehicle chocked" and the "vehicle not chocked" positions thereof.

The chock system 11 also includes restrainer means, as generally indicated at 85 in FIG. 3 of the drawings, for limiting the travel of the pair of wheel engageable means 27, 29 as they are outwardly extended to the "vehicle chocked" position thereof. More specifically, the restrainer means 85 includes a barrier-like member 87 fixedly attached to the carriage means 59 in any well known manner as by welding or the like, for abrupt engagement with a coacting driver member 89 which is fixedly attached, as by welding or the like, to the cross member 77. Therefore, as the piston member 83 moves in a direction which is opposite to the arrow 65, the pair of wheel engageable means 27, 29 extend outwardly to the "vehicle chocked" position thereof. It will be understood that the driver member 89 moves rearwardly also until it engages the barrier-like member 87 which prevents further pivotable movement of the wheel engageable chock means 27, 29 about the pivot pin 55. Of course, further rearward movement of the piston member 83 is effective in carrying the entire carriage means 59 and wheel engageable chock means 27, 29 rearwardly (compressing the spring 67) until such time as the wheel engageable chock means 27, 29 come in physical contact with the rear wheel W of the vehicle V, as at 27', 29' in FIG. 2.

The chock system 11 also includes roller means, as at 91 in FIG. 3, which is rotatably attached to the reach means 31, i.e., more specifically to the driver member 89, and which ridably engages the carriage means 59 for facilitating the movement of the wheel engageable chock means 27, 29 between the "vehicle chocked" and "vehicle not chocked" positions thereof. More specifically, the roller means 91 precludes binding of the articulate means 71 while at the same time minimizes the friction thereof by supporting the articulate means 71 in an optimum position.

Particular attention is now directed toward FIG. 4 of the drawings wherein it may be seen that the chock system 11 includes an electric motor 93 which rotatably drives a hydraulic pump 95, or the like, having a pressure release valve 97 suitably coupled thereto and communicated with a reservoir 99. As previously mentioned, the dockboard means 15 is raised and lowered with the hydraulic cylinder 17 while the lip member 19 thereof is raised and lowered with the hydraulic cylinder 21. Also, the wheel engageable chock means 27, 29 are moved in the manner previously described by hydraulic means 33 with the forward movement of the piston member 83 being in the direction of the arrow 65.

The chock system 11 also includes a single pole single throw switch 101 for selectively operating and de-energizing the motor 93. Also, a single pole double throw switch 103 is included for remotely operating the hydraulic cylinder means 33. In other words, a three position solenoid actuated valve 105 is electrically controlled by the switch 103 for controlling the movement of the piston member 83 in a manner to be fully described below.

Additionally, a single pole double throw switch 107 is included for remotely controlling the hydraulic cylinder 17. More specifically, the switch 107 is used in controlling a solenoid actuated three position valve 109 in a manner to be fully described below.

Also, a single pole double throw switch 111 is included for remotely controlling the lip member 19. More specifically, the switch 111 is used in remotely operating a solenoid actuated three position valve 113 in a manner to be described below.

The system 11 is suitably connected to a source of electrical power, e.g., through a plug 115 or the like being inserted in a convenient voltage outlet. A conductor 117, having one end thereof suitably grounded, is connected to the plug 115 in a typical fashion. Also, one end of a conductor 119 is connected to the plug 115 while the other end thereof is connected to a common terminal 121 of the switch 103. A conductor 123 interconnects the terminal 121 with a terminal 125 of the switch 101. A conductor 127 interconnects the terminal 125 with a terminal 129 of the first hydraulic pressure switch 43. A conductor 131 interconnects a terminal 133 with a common terminal 135 of the switch 111. A conductor 137 interconnects the terminal 133 (of the switch 43) with a common terminal 139 of the switch 107.

The output of the pump 95 is communicated with the valve 105 through a conduit 141. Additionally, the output of the pump 95 is communicated with the valve 109 through conduits 143, 145 while valve 113 is communicated therewith by a conduit 147. A series or loop of conduits 149, 150, 151 are communicated with the hydraulic cylinder means 33, i.e., respectively at either side of the piston member 83 (FIG. 3). A series or loop of conduits 153, 155, 157 are used to interconnect the valve 109 with the hydraulic cylinder 17.

A pair of conduits 159, 161 are used to interconnect the valve 113 with the hydraulic cylinder 21.

One end of a conduit 163 is coupled with a junction 165 of the conduits 153, 155 while the other end thereof (conduit 163) is coupled to the second hydraulic pressure switch 45.

One end of a conduit 167 is coupled with a junction, as at 169, of the conduits 149, 150 while the other end thereof is communicated with the first hydraulic pressure switch 43.

Accordingly, it may readily be seen that the first hydraulic pressure switch 43 is interposed between the power source, or the plug 115, and the switches 107, 111, i.e., the connection between the conductors 127, 131; 127, 137 may be interrupted therewith. Likewise, the second hydraulic pressure switch 45 is interposed between merely part of the switch 103 and the valve 105.

More specifically, one end of a conductor 171 is connected to a terminal 173 (of the switch 103) while the other end thereof is connected to a terminal 175 (of the switch 45). Also, one end of a conductor 177 is connected to a terminal 179 (of the switch 45) while the other end thereof is connected to a solenoid 181, i.e., energizing the solenoid 181 is effective in moving the valve 105 to the left (as shown) which communicates the conduits 141, 151 one with the other and the conduit 149 with the reservoir 99 (through a dump conduit 182).

One end of a conductor 183 is connected to a terminal 185 (of the switch 103) while the other end thereof is connected to a solenoid 187, i.e., energizing the solenoid 187 is effective in moving the valve 105 to the right as shown. Thus, this is effective in communicating 141 with the conduit 149 and communicating the conduit 151 with the reservoir 99 or through the dump conduit 182.

One end of a conductor 189 is connected to a terminal 191 (of the switch 107) while the other end thereof is connected to a solenoid 193, i.e., energizing the solenoid 193 is effective in moving the valve 109 to the left as shown. Thus, this is effective in communicating the conduit 145 with the conduit 157 and communicating the conduit 153 with the reservoir 99 or through a dump conduit 195.

One end of a conductor 197 is connected to a terminal 199 (of the switch 107) while the other end thereof is connected to a solenoid 201, i.e., energizing the solenoid 201 is effective in moving the valve 109 to the right as shown communicating the conduit 145 with the conduit 153 and communicating the conduit 157 with the dump conduit 195.

One end of a conductor 203 is connected to a terminal 205 (of a switch 111) while the other end thereof is connected to a solenoid 207, i.e., energizing the solenoid 207 is effective in moving the valve 113 to the left as shown. Thus, this is effective in communicating the conduit 147 with the conduit 161 and communicating the conduit 159 with a dump conduit 209.

One end of a conductor 211 is connected to a terminal 213 (of the switch 111) while the other end thereof is connected to a solenoid 215, i.e., energizing the solenoid 215 is effective in moving the valve 113 to the right as shown. Thus, this is effective in communicating the conduit 147 with the conduit 159 and communicating the conduit 161 with the dump conduit 209.

SEQUENCE OF OPERATION

Certain structure of the chock system 11 has been shown and described in FIG. 4 in certain positions so as to give a better understanding of the function thereof. However, in order to initiate this sequence of operation, it should be understood that the dockboard means 15 will be in the interrupted position 15', the lip member 19 will be in the position 19', while the wheel engageable chock means 27, 29 will be in the "vehicle unchocked" position even though it will be recognized that FIG. 4 shows the chock means 29 in the "vehicle chocked" position. Additionally, all of the switches will be assumed to be in either the open or neutral positions thereof. Likewise, the valves 105, 109, 113 will be assumed to be in the neutral positions thereof. Step one involves closing the switch 101 which, of course, is effective in energizing the motor 93. Thus, the pump 95 is driven so as to deliver fluid under pressure to the conduits 141, 143, 145, 147. However, since the valves 105, 109, and 113 are in the neutral positions, nothing more takes place at this time other than the normal pressure relief action of the valve 97.

It will be significant to note at this time that any operation of the switches 107, 111 is totally ineffective in accomplishing any action, since the hydraulic pressure switch 43 is in the open position as shown. On the other hand, throwing the switch 103 upwardly (which is the second sequential step) completes the circuit between the terminals 121, 185. This, of course, is effective in energizing the solenoid 187 which moves the valve 105 to the right as shown. Thus, fluid is delivered under pressure from the conduit 141, thence through the conduit 149, to the front side of the piston member 83 (FIG. 3) which moves the piston 83 rearward or in a direction opposite to the arrow 65. This, of course, moves the wheel engageable chock means 27, 29 to the "vehicle chocked" position in the same manner as previously described.

It should be noted, at this time, that since the conduit 167 is communicated with the conduit 149, i.e., at the junction 169, the hydraulic pressure switch 43 is pressurized sufficiently so as to close the switch 43 or complete the circuit between the terminals 129, 133. Switch 103 is now returned to the neutral position, i.e., as shown which is effective in returning the valve 105 to its neutral position, i.e., as shown. Therefore, pressure is captured in the conduits 149 and 167 which keeps the switch 43 in the closed position. It will be apparent to those skilled in the art that in the event, for any reason, it becomes desirable to unchock the vehicle prior to completing the remaining portion of the sequence, it is only necessary to move the switch 103 downward or close the terminals 121, 173. This, of course, causes the solenoid 181 to be energized since the pressure switch 45 has not, as yet, been depressurized.

With the vehicle V properly chocked it will now be safe to commence the loading or unloading of the vehicle V. Therefore, step three, which involves placing switch 107 downwardly is now accomplished. This, of course, closes the circuit between the terminals 139, 191 which is effective in energizing the solenoid 193. Thus, fluid under pressure is delivered from the conduit 145 through the conduit 157 which drives the piston of the cylinder 17 downwardly, i.e., moving the dockboard means 15 to the position as shown in solid lines. It should be noted that step three (energizing the solenoid 193) also communicates the conduit 153, hence the pressure switch 45, with the reservoir 99, i.e., through the dump conduit 195. This action will be more meaningful at the completion of the sequence, at which time it will again be mentioned. Switch 107 is now returned to the neutral position, i.e., as shown which is effective in allowing the valve 109 to return to its neutral position, i.e., as shown. Thus, fluid under pressure is captured in the conduit 157 while the pressure in conduit 153 is substantially nil.

Step four includes placing switch 111 downwardly, i.e., completing or closing the circuit between the terminals 135, 205 which is effective in energizing the solenoid 207. Thus, the valve 113 is moved to the left, as shown, which delivers fluid under pressure from the conduit 147 to the conduit 161. Thus, the lip member is moved to the operable position thereof or as shown in solid lines in FIG. 4.

Accordingly, the loading and unloading operations of the vehicle V may now be accomplished with absolute assurance that the vehicle V will not be inadvertently moved until such time that it is absolutely safe to do so.

More specifically, it is significant to note that any attempt to unchock the vehicle at this time is futile. In other words, moving the switch 103 downwardly, i.e., closing or completing the circuit between the terminals 121, 173, will not energize the solenoid 181 at this time (an action necessary in unchocking the vehicle) since the hydraulic pressure switch 45 is open, as shown, at this time, i.e., see step three above.

Furthermore, movement of the switch 111 in either direction which controls the lip member 19 has no effect in enabling the solenoid 181 to be energized. However, it will be seen that raising the dockboard means 15 to the position 15' will then enable the solenoid 181 to be energized.

More specifically, step five is now accomplished which involves placing the switch 107 upwardly, i.e., closing the circuit between the terminals 139, 199, which is effective in energizing the solenoid 201. This, of course, moves the valve 109 to the right, as shown. Thus, fluid under pressure is now delivered from the conduit 145 to the conduits 153 and 155 which raises the cylinder 17, thence the dockboard to the position of 15' thereof. At this same time, it is significant to note that the conduit 163 is also pressurized since it is communicated with the conduit 153 through the junction 165. Accordingly, the second hydraulic pressure switch 45 is now pressurized sufficiently so as to close the contacts thereof, i.e., completing the circuit between the terminals 175, 179.

Therefore, the wheel engageable chock means 27, 29 may now be moved to the "vehicle unchocked position". In other words, step six is now accomplished which involves placing the switch 103 downwardly, i.e., completing the circuit between the terminals 121, 173. This, of course, is effective in energizing the solenoid 181, since the switch 45 is now closed.

More specifically, fluid under pressure is delivered from the conduit 141 through the conduit 151, or to the back side of the piston 83 (as shown in FIG. 3) which drives the piston 83 rearwardly or in the direction opposite of the arrow 65. Thus, the wheel engageable chock means 27, 29 are moved from the "vehicle chocked" position to the "vehicle unchocked" position thereof. Also, it should be noted that the conduit 149, i.e., which interconnects the valve 105 with the hydraulic cylinder 33, is now communicated with the reservoir, i.e., through the dump conduit 182. Therefore, the pressure which was captured in the conduit 167, in keeping the switch 43 in a closed position, has now diminished substantially to zero. Therefore, the pressure switch 43 moves to the open position (as shown) simultaneously with energizing the solenoid 181.

Accordingly, the sequence of operation of the chock means 11 has now been completed. However, as previously mentioned, it is now significant to note that when completing step three above or energizing the solenoid 193, i.e., moving the valve 109 to the left as shown, the conduit 153 is simultaneously communicated with the dump conduit 195. Therefore, the pressure that had been captured in not only the conduits, 153, 155, but particularly conduit 163 for holding the switch 45 in the closed position, diminishes at that point in time substantially to zero. This, of course, causes the pressure switch 45 to open. Therefore, the above sequence of operation may not intentionally nor inadvertently be deviated from except, of course, as mentioned above, the wheel chock means 27, 29, may be returned to the "vehicle unchocked" position at any time prior to actually completing step number three. Thus, forklift operators and other dock workmen may go about performing their assigned tasks with absolute assurance that the Vehicle V will not be pulled away from the dock 13 prematurely. Thus, the hazard that existed heretofore has now been eliminated by the present invention.

Although the invention has been described and illustrated with respect to a preferred embodiment thereof, it should be understood that it is not intended to be so limited since changes and modifications made be made therein which are within the full intended scope of the invention.

I claim:

1. In a truck dock of the type having remotely controlled dockboard means which normally may selectively be moved between: (1) an operative position in which the floor of the elevated dock structure is bridged with the floor of a truck-like vehicle as it is parked on the apron of the dock for facilitating the loading and/or unloading process thereof, and (2) a stowed position in which use of the dockboard means is interrupted; of safety chock system means operatively coupled with said dockboard means for: (1) precluding the commencement of any loading and/or unloading operations involving the vehicle prior to the vehicle being properly chocked in place, and (2) conversely precluding the likelihood of inadvertent movement of the vehicle away from the dock prematurely before the actual completion of the loading and/or unloading operations; said safety chock system means comprising a main body member fixedly attached to the apron of the dock and being arranged thereon so as to be straddled by the wheels of the vehicle as it is being brought into a properly parked position, a pair of wheel engageable chock means for engagement with the rearward wheel structure of the vehicle in selectively rendering the vehicle substantially immovable, reach means for operatively coupling said pair of wheel engageable chock means to said main body member, and wheel chock actuating means for remotely controlling the movement of said reach means to enable said pair of wheel engageable chock means to be remotely operable between a "vehicle chocked" position and a "vehicle not chocked" position.

2. The apparatus as set forth in claim 1 in which said safety chock system includes preliminary check means for automatically precluding the operation of said dockboard means from said stowed position thereof prior to operatively moving said wheel engageable chock means to said "vehicle chocked" position thereof.

3. The apparatus as set forth in claim 2 in which said wheel chock actuating means and said dockboard means jointly include hydraulic system drive means responsive to electric system control means for: (1) remotely controlling the movement of said dockboard means between said "operative" and "stowed" positions thereof, and (2) remotely controlling the movement of said wheel engageable chock means between said "vehicle chocked" and "vehicle not chocked" positions thereof, and in which said preliminary check means includes a first hydraulic pressure actuated single pole single throw switch for electrically isolating said dockboard means until such time that said pair of wheel engageable chock means have been operatively moved to said "vehicle chocked" positions, said first hydraulic pressure switch being hydraulically responsive exclusively to pressure coincident with driving said wheel engageable chock means to said "vehicle chocked" position thereof.

4. The apparatus as set forth in claim 1 in which said safety chock system includes terminus check means for automatically precluding the operation of said wheel engageable chock means from said "vehicle chocked" position prior to operatively moving said dockboard means to said stowed position thereof.

5. The apparatus as set forth in claim 4 in which said wheel chock actuating means and said dockboard means jointly include hydraulic system drive means responsive to electric system control means for: (1) remotely controlling the movement of said dockboard means between said "operative" and "stowed" positions thereof, and (2) remotely controlling the movement of said wheel engageable chock means between said "vehicle chocked" and "vehicle not chocked" positions thereof, and in which said terminus check means includes a second hydraulic pressure actuated single pole single throw switch for electrically isolating merely that portion of said wheel chock actuating means which controls the movement thereof from said "vehicle chocked" position to said "vehicle not chocked" position until such time that said dockboard means has been operatively moved to said "stowed" position thereof, said second hydraulic pressure switch being hydraulically responsive exclusively to pressure coincident with driving said dockboard means to said "stowed" position thereof.

6. Safety chock system means for: (1) precluding the commencement of any loading and/or unloading operations involving a truck-like vehicle which may be parked at a truck loading dock prior to the vehicle being properly chocked in place, and (2) for precluding the likelihood of inadvertent movement of the vehicle away from the loading dock prematurely before the actual completion of the loading and/or unloading operations; said safety chock system means comprising a main body member intended to be fixedly attached to the apron of the loading dock and being disposed in such a manner as to be straddled by the wheels of the vehicle, a pair of wheel engageable chock means for engagement with the rearward wheel structure of the vehicle in selectively rendering the vehicle substantially immovable, reach means for operatively coupling said pair of wheel engageable chock means to said main body member, and wheel chock actuating means for remotely controlling from a vantage point the movement of said wheel reach means to enable said engageable chock means to be remotely operable between a "vehicle chocked" position and a "vehicle not chocked" position, said reach means including a pair of arm members each having inner and outer ends thereto, the inner ends of said pair of arm members being pivotally coupled to said main body member for enabling the outer ends of said pair of arm members which carry said pair of wheel engageable chock means, to swing outwardly toward either side of the vehicle, thus said pair of wheel engageable chock means may selectively be placed against the rearward wheels of the vehicle in rendering it substantially immovable.

7. The apparatus as set forth in claims 1, 2, 3 or 6 in which is included compensating means for compensating, within limits, of the dimensional variance in location of the wheel structure with respect to the rearwardmost end of the floor of different truck-like vehicles.

8. The apparatus as set forth in claim 7 in which said compensating means includes carriage means interposed between said main body member and said reach means, the rearward portion of said carriage means being slidably attached to said main body member for guidable constrained movement to and fro coincidently along the longitudinal axis of the vehicle with said reach means being attached to the forward portion of said carriage means, and bias means for yieldably urging said reach means in a forward direction away from said main body member to enable movement of said pair of wheel chock means from a first extreme position corresponding to lower limits of the variance in location of the wheel structure with respect to the rearwardmost end of the floor of certain vehicles to a second extreme position thereof corresponding to upper limits thereof.

9. The apparatus as set forth in claim 8 in which said compensating means includes stop means coacting with said main body member and said carriage means for limiting the forwardmost travel of said carriage means.

10. The apparatus as set forth in claim 8 in which is included roller means rotatably attached to said reach means and ridably engaging said carriage means for facilitating the movement of said wheel engageable chock means between said "vehicle chocked" and "vehicle not chocked" positions thereof.

11. The apparatus as set forth in claims 1, 2, 3 or 6 in which said reach means includes articulate means for causing said pair of wheel engageable chock means to swing arcuately through a quadrant in the process of being moved between said "vehicle chocked" and said "vehicle not chocked" positions thereof.

12. The apparatus as set forth in claims 1, 2, 3 or 6 in which is included restrainer means for limiting the travel of said pair of wheel engageable chock means as they are outwardly extended to the "vehicle chocked" position thereof.

* * * * *